(12) United States Patent
Wang

(10) Patent No.: US 6,243,808 B1
(45) Date of Patent: Jun. 5, 2001

(54) DIGITAL DATA BIT ORDER CONVERSION USING UNIVERSAL SWITCH MATRIX COMPRISING ROWS OF BIT SWAPPING SELECTOR GROUPS

(75) Inventor: Hsinshih Wang, Fremont, CA (US)

(73) Assignee: Chameleon Systems, Inc., San Jose, CA (US)

( * ) Notice: Subject to any disclaimer, the term of this patent is extended or adjusted under 35 U.S.C. 154(b) by 0 days.

(21) Appl. No.: 09/264,025

(22) Filed: Mar. 8, 1999

(51) Int. Cl.[7] ....................................................... G06F 5/00
(52) U.S. Cl. ............................................. 712/300; 708/204
(58) Field of Search ............................. 708/204; 712/300

(56) References Cited

U.S. PATENT DOCUMENTS

| | | | |
|---|---|---|---|
| 5,265,259 | * | 11/1993 | Satou et al. ........................... 712/300 |
| 5,524,256 | * | 6/1996 | Turkowski ............................ 712/300 |
| 5,819,117 | * | 10/1998 | Hansen ................................. 712/300 |
| 5,948,099 | * | 9/1999 | Crawford et al. .................... 712/225 |
| 6,078,937 | * | 6/2000 | Vatinel ................................. 708/209 |

* cited by examiner

Primary Examiner—Kenneth S. Kim
(74) Attorney, Agent, or Firm—Burns, Doane, Swecker & Mathis LLP

(57) ABSTRACT

An apparatus and method of performing random bit swapping including bit (single bit) swapping, nibble (4-bit) swapping, byte (8-bit) swapping, and half word (16-bit) swapping including a matrix of rows of two-to-one multiplexers. Each row of multiplexers shares the same control signal such that all of the multiplexer in a given row either outputs a "non-swapped" bit value or a "swapped" bit value. In addition, multiplexers are grouped within rows to allow 2-bit, 4-bit, 8-bit, and n-bit swaps in each consecutive row. Depending on the shared multiplexer controls for each row, the matrix can be programmed to perform any swapping function or possible bit pattern. The number of bits output by the matrix determines the number of rows used, e.g., an 8-bit dataword uses 3 rows, 16-bit word uses 4 rows, $2^N$-bit word uses N rows.

21 Claims, 5 Drawing Sheets

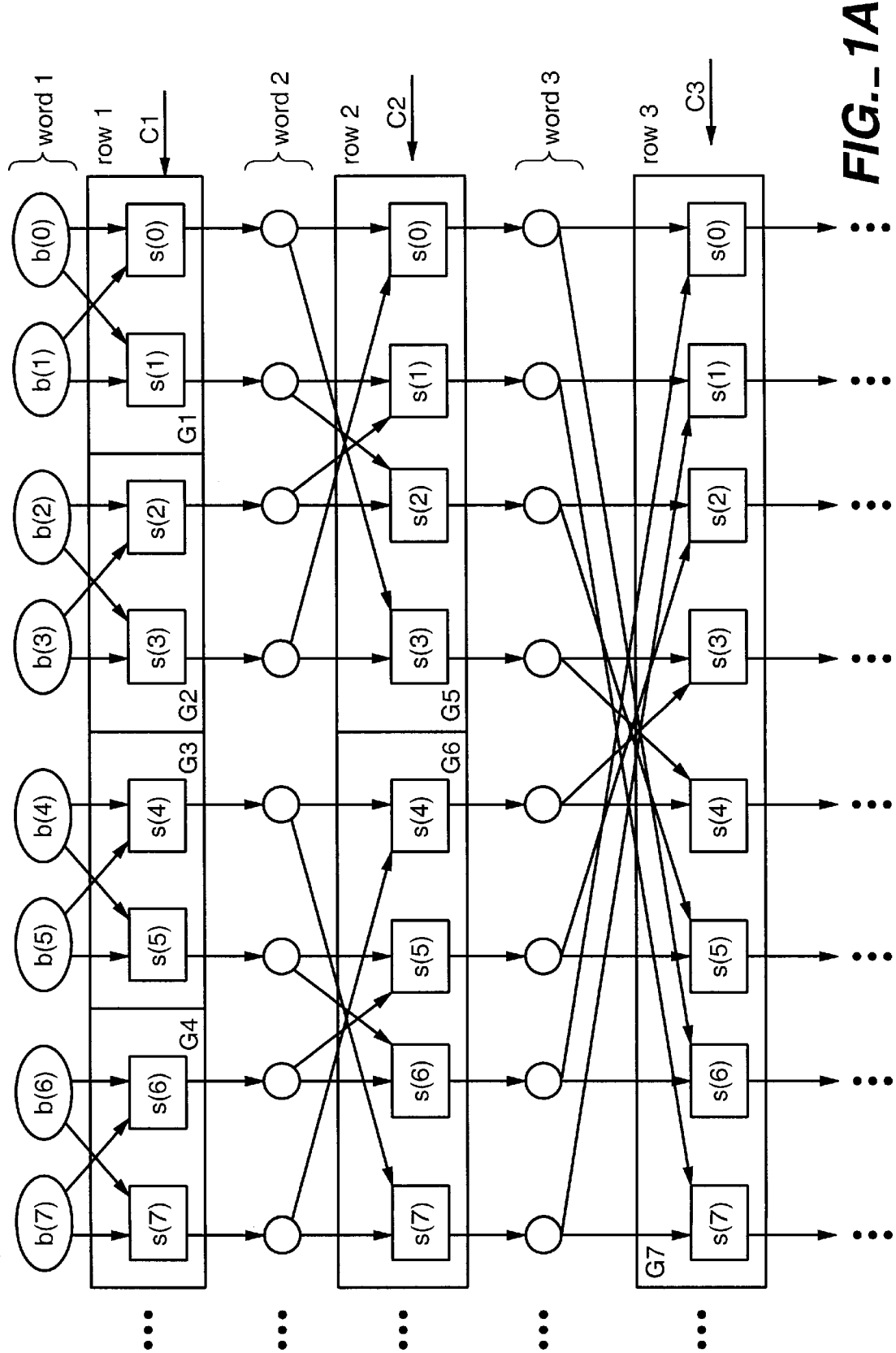
FIG._1A

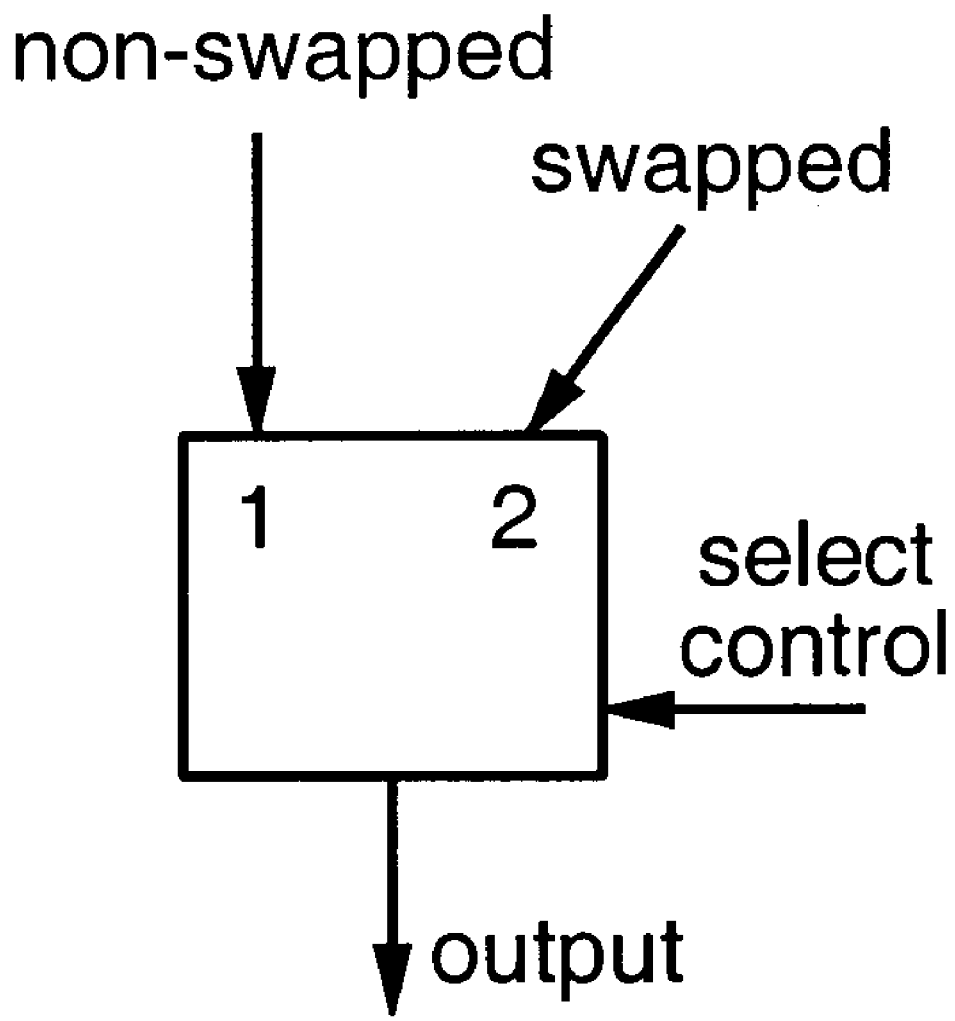
FIG._1B

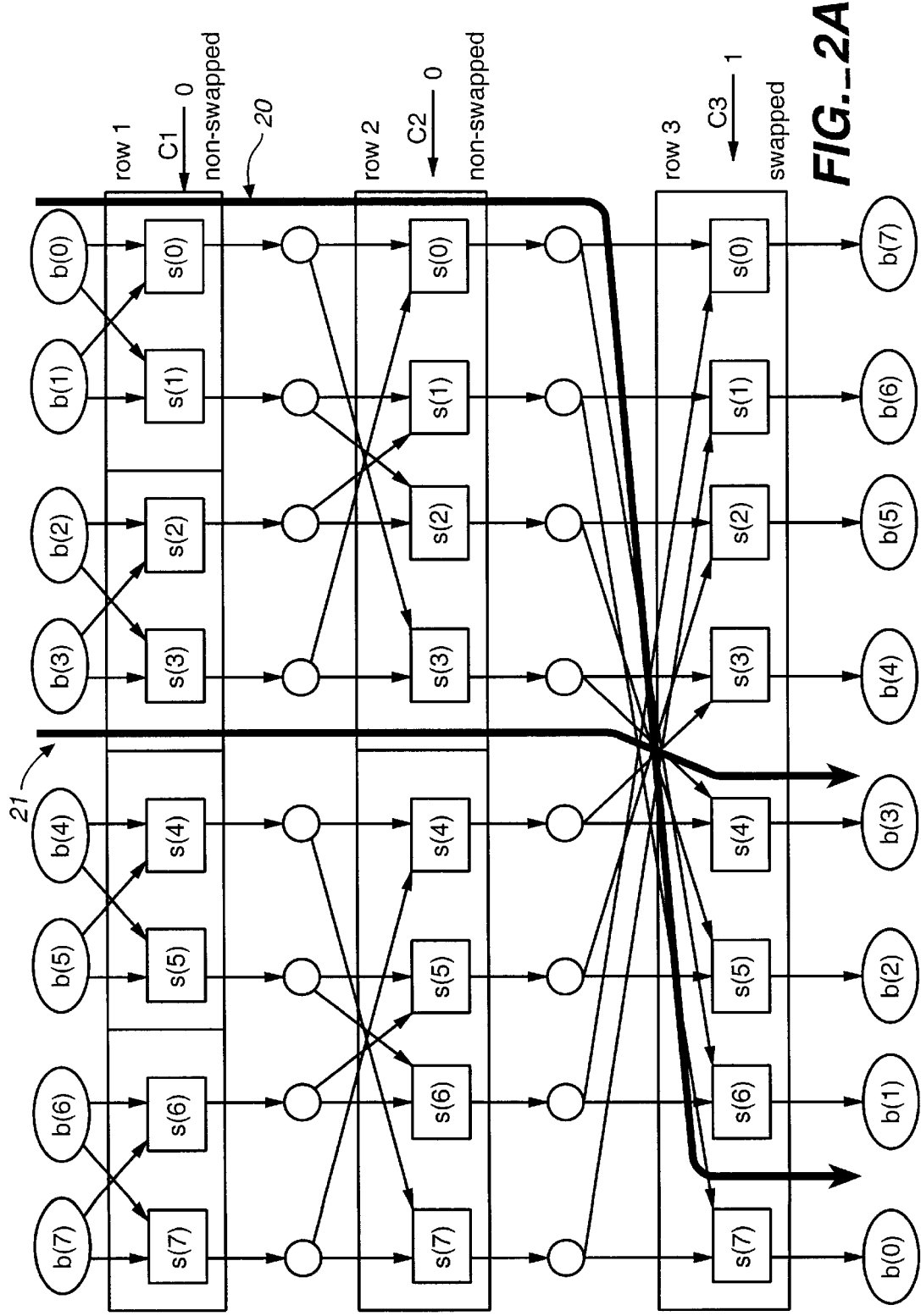
FIG._2A

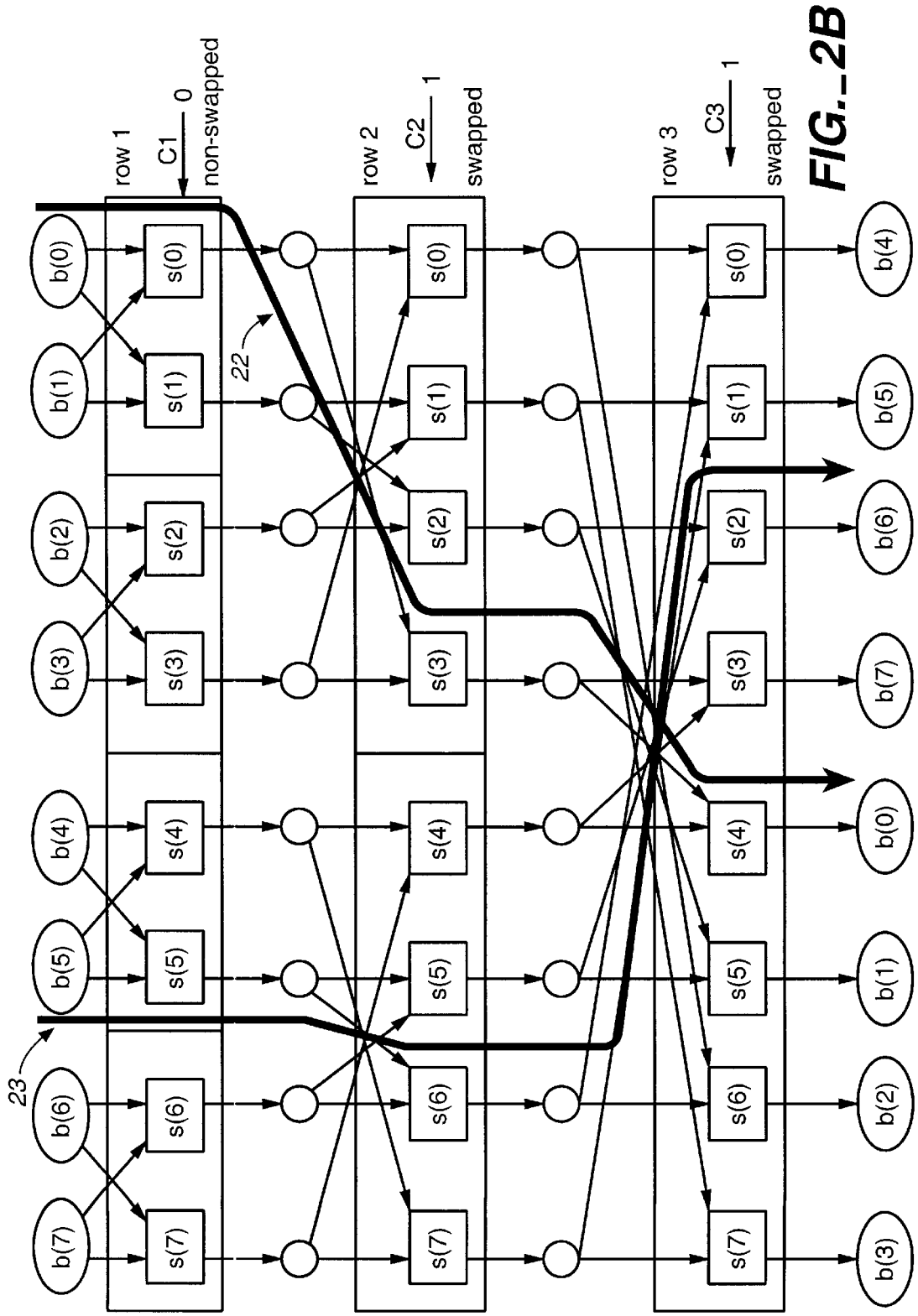
FIG._2B

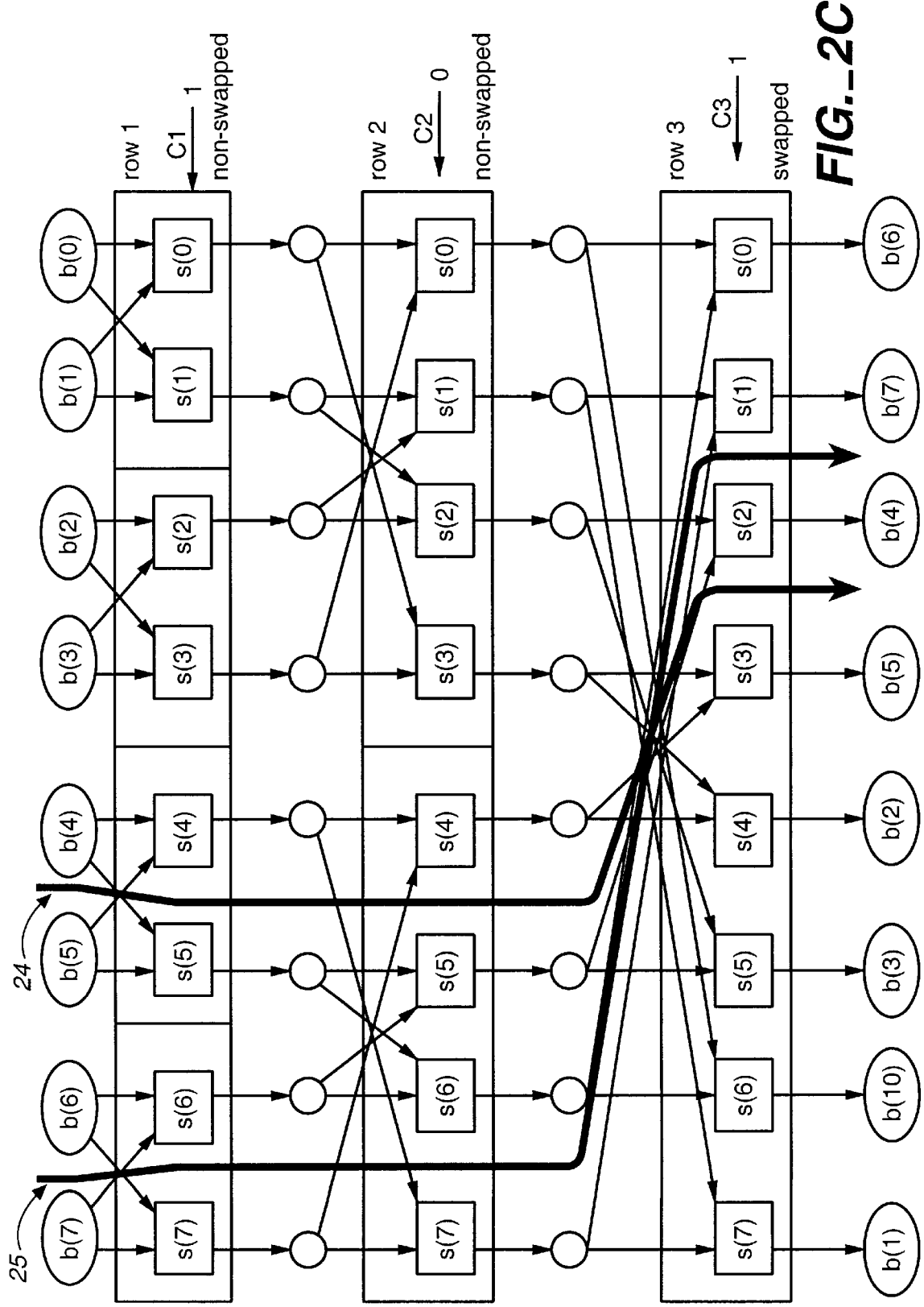

DIGITAL DATA BIT ORDER CONVERSION USING UNIVERSAL SWITCH MATRIX COMPRISING ROWS OF BIT SWAPPING SELECTOR GROUPS

BACKGROUND OF THE INVENTION

1. Field of The Invention

The present invention relates to the process of bit, byte and word swapping, and particularly to implementing processor functions by swapping bits, bytes and words.

2. State of The Art

In a digital processing system, functions or operations are performed on digital words by manipulating or swapping the bits (single bit), nibbles (4-bits), bytes (8-bits), or half words (16-bits) of a digital word. For instance, a well known operation performed within processing systems is changing the format of a digital word from a big endian format to a little endian format. In particular, a digital word in a big endian format has its least significant bit starting from the highest order address of the word. A word in a little endian format has its least significant bit starting from the lowest order address of the word. Often times when interfacing between processing systems, bit swapping is required to accommodate the particular endian format of the system receiving or sending the data. Swapping might also be performed for other operations within the processing system such as a bit field extraction or a Viterbi operation.

In general, the manner in which swapping was previously performed was to design a system that is hardwired to perform only one particular swapping pattern. For instance, a hardwired system might be designed to exclusively perform a big endian to little endian bit swapping operation. However, providing hardware circuitry for performing swapping in this manner can result in a significant amount of additional hardware depending on the amount and type of swapping required in the system. Another typical prior art swapping design technique utilizes large multiplexers having many inputs which are controlled with complex control signaling resulting in significant space and power usage. Alternatively, swapping has been performed by a sequence of digital signal processing (DSP) steps such as shifting, masking, and storing. The disadvantage of performing swapping in this manner is that it can tie up valuable processing cycles retrieving and loading data and, in general, can take many processing cycles to accomplish.

The present invention is an apparatus and system that is programmable to perform any random bit, nibble, byte, and half word swap utilizing simplified multiplexer circuitry and minimal control signaling thereby obviating hardwired swapping systems, complex high-power multiplexer systems, and DSP swapping techniques.

SUMMARY OF THE INVENTION

An apparatus and method of performing random bit swapping of a digital word (e.g., bit (single bit) swap, nibble (4-bit) swap, byte (8-bit) swap, and half word (16-bit) swap). The apparatus includes a matrix or array of means for signal path selection for selecting between a "non-swapped" bit value and a "swapped" bit value. In one embodiment, the selection means is a multiplexer. The matrix of selection means are arranged into rows and all selection means in a given row are coupled to the same control line such that all of the selection means in a given row pass either the "non-swapped" bit value when controlled by a first control signal or all of the selection means pass the "swapped" bit value when controlled by a second control signal. In addition, the selection means in each row are grouped such that the "non-swapped" and "swapped" bit values coupled to each selection means' inputs in a given group originates from within the given group. In one embodiment, the group sizes of the selection means progressively increases from the first row to the last row. In one embodiment, the group size for the first row is two selection means per group and the group size increases to $2^n$ for subsequent rows n=2, 3, ... N, where N is the total number of rows and n is the row number. In one embodiment, the number of bits in the word being operated on, m, is equal to $2^N$ and the number of bits m in the word corresponds to the number of selection means in each row.

In one embodiment of an apparatus for performing swapping of an 8-bit data word, the matrix includes three rows of eight two-to-one multiplexers. The first row includes four groups of two adjacent two-to-one multiplexers. The second row includes two groups of four adjacent multiplexers and the third row includes one group of eight adjacent multiplexers. Each multiplexer in each group of the first row has its first input coupled to a "non-swapped" bit value having an associated bit location that corresponds to the location of the multiplexer within the row and has its second input coupled to a "swapped" bit value which corresponds to the bit value of the adjacent multiplexer in the group. Each multiplexer in each group of the remaining two rows has its first input coupled to a "non-swapped" bit value received from the previous (i.e., first) row and having an associated bit location that corresponds to the location of the multiplexer within the row and has its second input coupled to a "swapped" bit value having an associated bit location that is symmetrically opposite to the "nonswapped" bit value location within the group. The matrix is controlled by three control lines, each row having an associated single control line such that the select input of each multiplexer in a given row is coupled to that single control line.

In one embodiment the three row—eight two-to-one multiplexer matrix is controlled such that the first row selects the "non-swapped" bit value, the second row selects the "non-swapped" bit value, and the third row selects the "swapped" bit value resulting in a complete bit reverse of the 8-bit input word. This type of swapping operation corresponds to a Fast Fourier Transform (FFT) operation.

In a second embodiment the three row—eight two-to-one multiplexer matrix is controlled such that the first row selects the "non-swapped" bit value, the second row selects the "swapped" bit value, and the third row selects the "swapped" bit value resulting in a nibble swap of the 8-bit input word. This type of swapping operation corresponds to a big endian/little endian transformation operation.

In a third embodiment the three row—eight two-to-one multiplexer matrix is controlled such that the first row selects the "swapped" bit value, the second row selects the "non-swapped" bit value, and the third row selects the "swapped" bit value resulting in a 2-bit swap of the 8-bit input word.

BRIEF DESCRIPTION OF THE DRAWINGS

The present invention may be further understood from the following written description in conjunction with the appended drawings. In the drawings:

FIG. 1A shows one embodiment of a universal switch in accordance with the present invention;

FIG. 1B shows a single path selection means; and

FIGS. 2A, 2B, and 2C show embodiments of a universal switch controlled to perform specific functions in accordance with the present invention.

DETAILED DESCRIPTION OF THE PREFERRED EMBODIMENTS

FIG. 1A shows a generalized embodiment of an apparatus for performing bit swapping including a matrix of signal path selection means arranged in 1, 2, 3, . . . rows.

The selection means are grouped within each row such that the group size of each row is progressively increased for each consecutive row. For instance, in the embodiment shown in FIG. 1A, the first row has a group size of two, the second row has a group size of four. In the embodiment shown in FIG. 1A, the group size is progressively increased wherein the group size for a given row is $2^n$ where n is the row number. For example, for row n=1, the group size is $2^n=2^1=2$; for row n=2, the group size is $2^2=4$; and for n=3 the group size is $2^3=8$.

It should be understood, in other embodiments of the present invention the group size can be progressively increased in different increments and have different sizes than that shown in FIG. 1A. Alternatively, group sizes do not have to be progressively increased and instead may be any random size for each row.

In addition, it should be understood that in one embodiment, the matrix includes N rows, where $2^N$=word size being operated on. For instance, in the case of an eight bit word, the matrix includes three rows of selection means which allows any combination of swapping operations to be performed on the word dependent on the three control signals applied to the matrix.

Coupled to the input of each row of multiplexers is a digital word (e.g., word 1 is coupled to row 1, word 2 is coupled to row 2, word 3 is coupled to row 3 etc.). The number of bits m in each word corresponds to the number of selection means in each row. For the embodiment shown in FIG. 1A, the word size is eight bits, consequently there are eight selection means per row. However, it should be understood that in other embodiments, the number of bits in the word can be larger or smaller such that the number of selection means can be larger or smaller. FIG. 1A shows that each row can continue on to include more selection means.

Each signal path selection means (FIG. 1B) has two signals or bit value inputs (1 and 2), one select control input, and an output. In response to the select control input state of the selection means it outputs either the first or second input value. In one embodiment, the signal path selection means is a two-to-one multiplexer. In an alternative embodiment, the signal path selection means is embodied as combinational logic such as a combination of NAND and/or NOR gates.

The first input of each selection means is coupled to a "non-swapped" bit value wherein the "non-swapped" bit value is defined as the bit value having the same sequential location within the word being "swapped" as the selection means has within row of selection means performing the swap. For example, selection means s(7) receives a "non-swapped" bit value b(7) on its first input. The second input of each selection means is coupled to a "swapped" bit value wherein the "swapped" bit value is defined as a bit value other than the "non-swapped" bit value and being within the same group as the "non-swapped" bit value. For instance, the selection means s(7) receives a "swapped" bit value b(6) on its second input.

In one embodiment, the "swapped" bit value is in the symmetrically opposite location within the given group with respect to the "non-swapped" bit value. For instance, in row 2, selection means s(7) receives the last bit value b(7) of word 2 (i.e., the "non-swapped" bit value) in group G6 (FIG. 1A) on its first input and receives the first bit value b(4) in group G6 (i.e., the "swapped" bit value on its second input). Similarly, in the same group G6, selection means s(6) receives the second to the last bit value b(6) on its first "non-swapped" input and receives the second to the first bit value b(5) on its second "swapped" input.

In operation, a common control signal (signals C(1)–C(3)) controls each row such that it either passes all "non-swapped" bit values on the first input of each selection means or passes all "swapped" bit values on the second input of each selection means. For instance in the case of row 1 when the control signal is in a first state, each of the first input bit values b(0)–b(7) are passed through its corresponding selection means s(0)–s(7), respectively. Specifically, selection means s(0) passes bit value b(0); selection means s(1) passes bit value b(1); selection means s(m) passes bit value b(m), (for m=0, 1, . . . 7). When the control signal is in its second state the "swapped" bit values on the second input of each selection means are passed such that each bit value is "swapped" with another bit value within the same group. Hence, in the embodiment shown in FIG. 1A, row 1 either performs no swapping or 2-bit swapping of all bits in word 1; row 2 either performs no swapping or 4-bit (nibble) swapping of all bits in word 2; and row 3 either performs no swapping or 8-bit (byte) swapping of all bits in word 3.

FIGS. 2A–2C show three embodiments of a matrix in accordance with the present invention for performing m=8-bit swapping operations. In this embodiment, the matrix includes a total of N=3 rows of eight multiplexers (s(0)–s(7)) each. Multiplexers are grouped where group size=$2^n$ and n is the row#. Hence, row 1 has four groups of two multiplexers s(7) and s(6), s(5) and s(4), s(3) and s(2), and s(1) and s(0), row 2 has two groups of four multiplexers s(7)–s(4) and s(3)–s(0), and row 3 has one group of eight multiplexers s(7)–s(0). Each of the matrixes in FIGS. 2A–2C are controlled differently and hence each perform different bit swapping operations or processor functions. The control signals C1–C3 applied to the matrix determine what operation or function that is performed.

In FIG. 2A, a "001" control signal is applied (i.e., C1=0, C2=0, C3=1) which causes the first and second rows to pass the "non-swapped" bit value and the third row to pass the "swapped" bit value (assuming that a "0" control signal causes a multiplexer to pass the signal on its first input port and a "1" control signal causes the multiplexer to pass the signal on its second input port). Two paths (20 and 21) show how the bit values b(0) and b(3) pass through the matrix. As can be seen, b(0) is swapped with b(7) and b(3) is swapped with b(4). This matrix performs an 8-bit bit reverse operation which can be used in an 8-bit Fourier transform.

In FIG. 2B, a "011" control signal is applied (i.e., C1=0, C2=1, C3=1) which causes the first row to pass the "non-swapped" bit value and the second and third rows to pass the "swapped" bit value. Paths 22 and 23 show how bit values b(0) and b(5) pass through the matrix. This matrix performs an 8-bit nibble swap operation on an 8-bit word which results in a 8-bit word nibble swapping.

Finally, in FIG. 2C, a "101" control signal is applied (i.e., C1=1, C2=0, C3 32 1) which causes the first row to pass the "swapped" bit value, the second row to pass the non-swapped bit value, and the third row to pass the "swapped" bit value. Paths 24 and 25 show how bit value b(4) and b(7) are passed through the matrix. This matrix performs a 2-bit swap of an 8-bit word which results in an 8-bit word with a 2-bit reverse function.

A method of bit swapping in accordance with one embodiment of the present invention includes the steps of arranging a plurality of multiplexers into an array including rows of multiplexers, grouping the multiplexers within each row, controlling all of the multiplexers in each row with the same control signal such that for a given row either all of the bits are swapped within their respective groups or all of the bits are not swapped. In one embodiment, the method of the present invention includes the step of progressively increasing the group size of each successive row with respect to the preceding row. And in still a further embodiment, the group size is progressively increased such that the group size for a given row#=n, is $2^n$ for row#=1, 2, 3, ... N, where N=total number of rows. Finally, swapping within a given group is performed by swapping bits having the symmetrically opposite bit location within the same group.

In the preceding description, numerous specific details are set forth, such as the number of multiplexers per row or the number of rows in the matrix in order to provide a thorough understanding of the present invention. It will be apparent, however, to one skilled in the art that these specific details need not be employed to practice the present invention. In other instances, well known logic structures and components have not been described in order to avoid unnecessarily obscuring the present invention.

Moreover, although the components of the present invention have been described in conjunction with certain embodiments, it is appreciated that the invention can be implemented in a variety of other ways. Consequently, it is to be understood that the particular embodiments shown and described by way of illustration is in no way intended to be considered limiting. Reference to the details of these embodiments is not intended to limit the scope of the claims which themselves recite only those features regarded as essential to the invention.

What is claimed is:

1. An apparatus for randomly swapping bit locations of a digital bit value having associated consecutive bit locations, the apparatus comprising:

input means of receiving the digital bit value;

a matrix of means for selecting between two bit values from the input means and outputting one of said two bit values, said matrix including rows of said selection means;

each row of said selection means including groups of selection means;

said each selection means in each selection means group selecting between one of a first non-swapped bit value and a second swapped bit value dependent upon its control signal; and wherein all of said selection means in a given row are controlled with the same control signal so as to select the same one of said first non-swapped bit value and said second swapped bit value within each group of selection means.

2. The apparatus as described in claim 1 wherein said selection means are two-to-one multiplexers.

3. The apparatus as described in claim 1 wherein said digital bit value include m bits and each row includes m selection means.

4. The apparatus as described in claim 3 wherein said matrix includes N rows and wherein said number of selection means m=$2^N$.

5. The apparatus as described in claim 1 wherein said second swapped bit value is in a symmetrically opposite bit location within said each selection means' corresponding group with respect to said first non-swapped bit value.

6. The apparatus as described in claim 1 wherein the number of selection means in said each group is the same for said each row and wherein the number of selection means progressively increases for each consecutive row in said matrix.

7. The apparatus as described in claim 6 wherein for said each row n (for n=1, 2, 3, ... N), said number of selection means in said each group is equal to $2^n$ wherein N is the number of rows in said matrix.

8. A method of randomly swapping bit locations of a digital value having m bits with associated consecutive bit locations, said method comprising the steps of:

inputting the digital bit value into an input means;

arranging a plurality of signal path selection means into a matrix including rows of signal path selection means;

grouping said selection means into groups of selection means in each of said rows wherein the groups correspond to the number of rows; and for each row, providing the same control to each of said signal path selection means in said row such that all of said signal path selection means in said row passes one of a non-swapped bit value and a swapped bit value within each group of selection means.

9. The method as described in claim 8 wherein said step of grouping further comprises the step of grouping said selection means in each row so as to have the same number of selection means and grouping said selection means into progressively larger groups for each consecutive row of said matrix.

10. The method as described in claim 9 wherein said step of grouping further comprises the step of grouping said progressively larger groups into groups of $2^n$ selection means, for n=row number=1, 2, ... N, wherein N is the number of rows in said matrix.

11. The method as described in claim 8 wherein said swapped and said non-swapped bit values have associate bit locations within a given group and wherein said swapped bit value has an associated bit location which is symmetrically opposite with respect to said non-swapped bit value within said given group.

12. The method as described in claim 8 wherein said step of arranging said plurality of selection means into a matrix comprises the step of including m selection means per row where m is the number of digital bit values in said group of bit values and including N rows of selection means where m=$2^N$.

13. The method as described in claim 8 further including the step of implementing said selection means as two-to-one multiplexers.

14. An apparatus for randomly swapping locations of digital bits of m consecutive digital bit values each having an associated bit location, said apparatus comprising:

an array of multiplexers for selecting between two bit values and outputting one of said two bit values, said array including N rows of multiplexers;

each row n (for n=1, 2, ... N) of said multiplexers being grouped into groups of $2^n$ multiplexers;

said multiplexer in each group selecting between a first non-swapped bit value and a second swapped bit value, said swapped bit value and said non-swapped bit value being associated with a same group and wherein said swapped bit value being in a symmetrically opposite bit location with respect to said non-swapped bit value within said associated same group; and wherein all of said multiplexers in a given row are controlled with the same control signal so as to select the same one of said first non-swapped bit vale and said second swapped bit value.

15. The apparatus as described in claim 14 wherein said all of said multiplexers are controlled so as to perform a m-bit reversal on an m-bit group of bit values.

16. The apparatus as described in claim 14 wherein said all of said multiplexers are controlled so as to perform an endian transformation on said group of m-bit values.

17. The apparatus as described in claim 14 wherein said all of said multiplexers are controlled so as to perform a two-bit swap of an m-bit value.

18. The apparatus as described in claim 14 wherein m is equal to eight and N is equal to three.

19. The apparatus as described in claim 15 wherein m is equal to eight and N is equal to three and wherein for row n=1 all of said multiplexers are controlled to select said first non-swapped bit value, for row n=2 all of said multiplexers are controlled to select said first non-swapped bit value, and for row n=3 all of said multiplexers are controlled to select said second swapped bit value.

20. The apparatus as described in claim 16 wherein m is equal to eight and N is equal to three and wherein for row n=1 all of said multiplexers are controlled to select said first non-swapped bit value, for row n=2 all of said multiplexers are controlled to select said second swapped bit value, and for row n=3 all of said multiplexers are controlled to select said second swapped bit value.

21. The apparatus as described in claim 17 wherein m is equal to eight and N is equal to three and wherein for row n=1 all of said multiplexers are controlled to select said second swapped bit value, for row n=2 all of said multiplexers are controlled to select said first non-swapped bit value, and for row n=3 all of said multiplexers are controlled to select said second swapped bit value.

* * * * *

UNITED STATES PATENT AND TRADEMARK OFFICE
CERTIFICATE OF CORRECTION

PATENT NO. : 6,243,808 B1  
DATED : June 5, 2001  
INVENTOR(S) : Wang

It is certified that error appears in the above-identified patent and that said Letters Patent is hereby corrected as shown below:

Column 4,
Line 60, delete "C3 32 1" and insert -- C3=1 --.

Column 5,
Line 59, delete "include" and insert -- includes --.

Column 7,
Line 1, delete "vale" and insert -- value --.

Signed and Sealed this

Seventh Day of September, 2004

JON W. DUDAS
*Director of the United States Patent and Trademark Office*